(12) United States Patent
Munemura et al.

(10) Patent No.: US 9,371,022 B2
(45) Date of Patent: Jun. 21, 2016

(54) VEHICLE SEAT

(75) Inventors: Nozomu Munemura, Yokohama (JP);
Hironobu Nakane, Yokohama (JP);
Atsuo Matsumoto, Yokohama (JP); Ryo Nagahara, Yokohama (JP); Kensuke Nagai, Yokohama (JP)

(73) Assignee: NHK SPRING CO., LTD., Yokohama-Shi (JP)

( * ) Notice: Subject to any disclaimer, the term of this patent is extended or adjusted under 35 U.S.C. 154(b) by 269 days.

(21) Appl. No.: 13/885,381

(22) PCT Filed: Nov. 7, 2011

(86) PCT No.: PCT/JP2011/075628
§ 371 (c)(1),
(2), (4) Date: Aug. 5, 2013

(87) PCT Pub. No.: WO2012/077444
PCT Pub. Date: Jun. 14, 2012

(65) Prior Publication Data
US 2013/0307301 A1 Nov. 21, 2013

(30) Foreign Application Priority Data
Dec. 9, 2010 (JP) ................................. 2010-275006

(51) Int. Cl.
*B60N 2/427* (2006.01)
*B60N 2/42* (2006.01)
(Continued)

(52) U.S. Cl.
CPC .............. *B60N 2/42709* (2013.01); *B60N 2/22* (2013.01); *B60N 2/4214* (2013.01); *B60N 2/4228* (2013.01); *B60N 2/42745* (2013.01); *B60N 2/682* (2013.01)

(58) Field of Classification Search
CPC ........... B60N 2/42709; B60N 2/42745; B60N 2/4214; B60N 2/4228; B60N 2/682; B60N 2/22
See application file for complete search history.

(56) References Cited

U.S. PATENT DOCUMENTS 3,501,200 A * 3/1970 Ohta ......................... 297/452.19
5,676,421 A * 10/1997 Brodsky ................... 297/216.13
(Continued)

FOREIGN PATENT DOCUMENTS

DE 19718050 A1 11/1998
DE 102009002825 A1 11/2010
(Continued)

OTHER PUBLICATIONS

Extended Search Report issued May 26, 2014 in corresponding EP application No. 11846652.3.
(Continued)

*Primary Examiner* — David R Dunn
*Assistant Examiner* — Tania Abraham
(74) *Attorney, Agent, or Firm* — Knobbe Martens Olson & Bear LLP

(57) ABSTRACT

In a vehicle seat (10), a deformable portion (32) extends continuously from an edge portion of a placement hole (28) towards an outside of the placement hole (28). When the deformable portion (32) is plastically deformed by a fastening bolt (40), the deformable portion (32) does not readily deform so as to be pushed outwards, but deforms so as to be squashed. When a low press-contact force acts on a side face (32D), the deformable portion (32) does not readily perform plastic deformation, and an impact load imparted to a seatback frame (44) can be stably absorbed by the deformable portion (32). Impact load imparted to the seatback frame (44) can be continuously absorbed by the deformable portion (32) since the deformable portion (32) deforms continuously. Accordingly, impact load imparted to the seatback frame (44) can be efficiently absorbed by the deformable portion (32).

7 Claims, 13 Drawing Sheets

(51) Int. Cl.
  *B60N 2/68* (2006.01)
  *B60N 2/22* (2006.01)

(56) References Cited

U.S. PATENT DOCUMENTS 6,053,571 A * 4/2000 Faigle ..................... 297/216.13
6,164,720 A * 12/2000 Haglund .................... 297/216.1

FOREIGN PATENT DOCUMENTS

| JP | U 4-124308 | 11/1992 |
| JP | 10-309968 | 11/1998 |
| JP | 2008-230557 | 10/2008 |
| JP | 2008-238969 | 10/2008 |
| JP | 2009-220744 | 10/2009 |
| JP | 2010-500213 | 1/2010 |
| JP | 2010-524764 | 7/2010 |

OTHER PUBLICATIONS

Notice of Reasons for Rejection mailed Mar. 31, 2015 in corresponding Japanese Application No. 2012-547749.

* cited by examiner

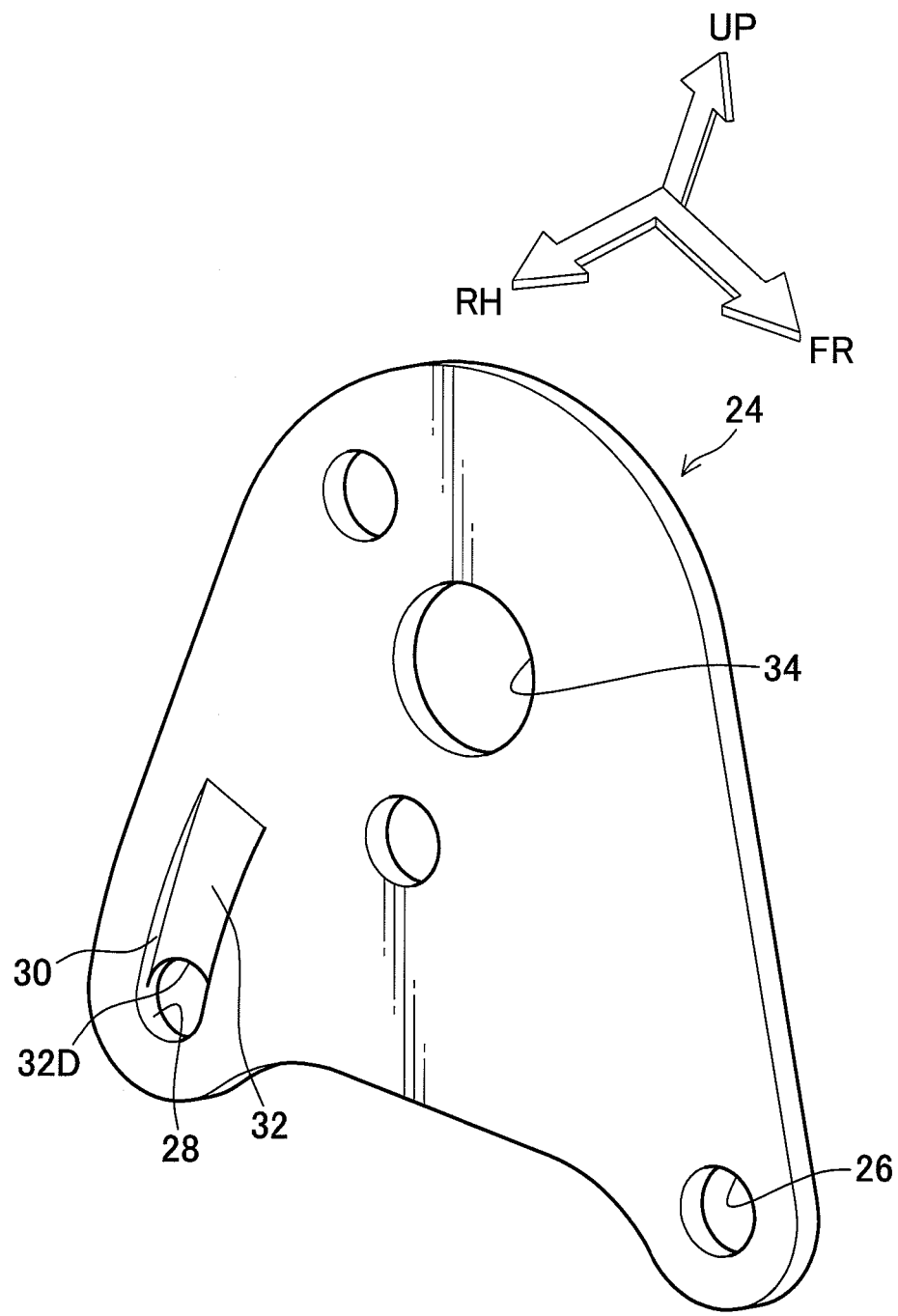

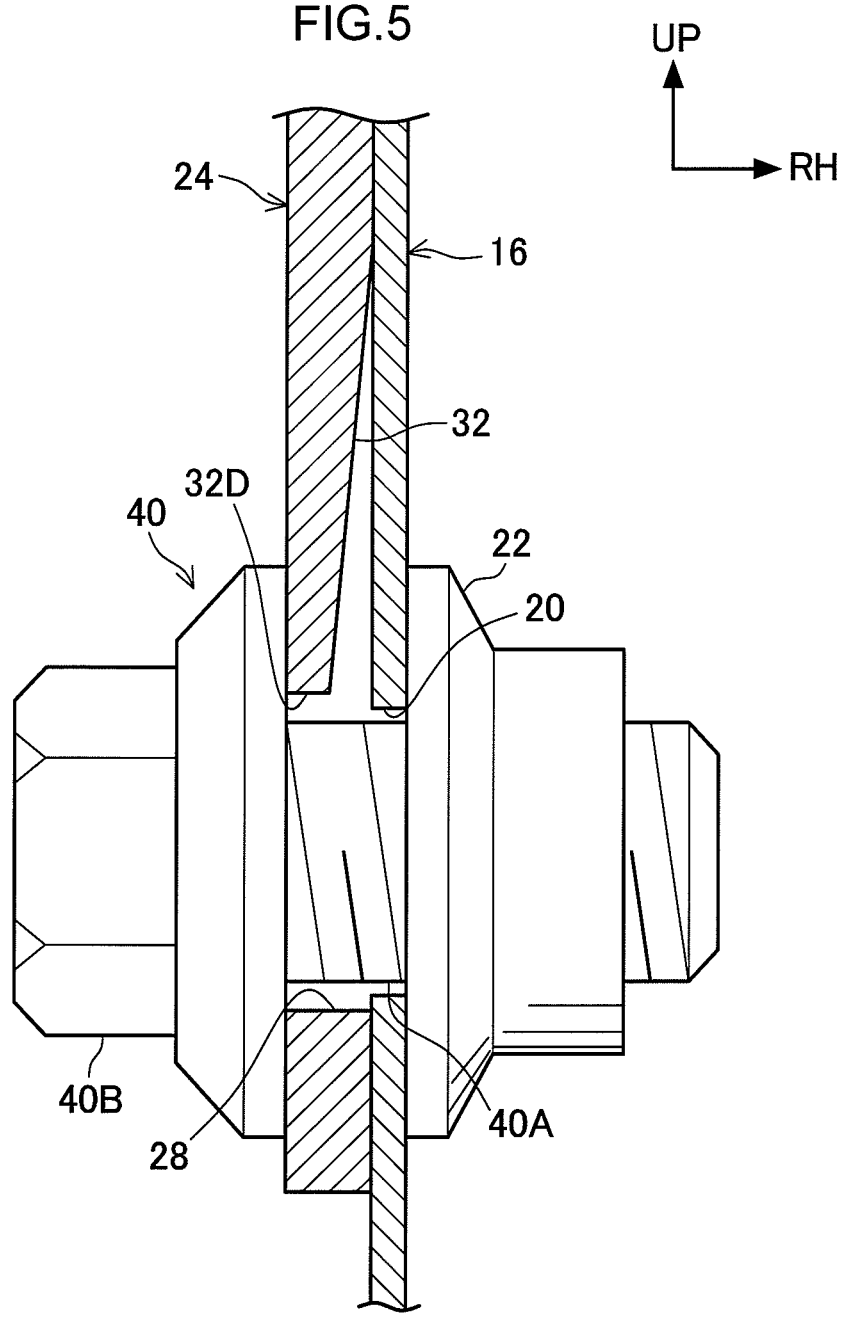

VEHICLE SEAT

CROSS-REFERENCE TO RELATED APPLICATIONS

This application is the U.S. National Phase under 35. U.S.C. §371 of International Application PCT/JP2011/075628, filed Nov. 7, 2011, which claims priority to Japanese Patent Application No. 2010-275006, filed Dec. 9, 2010. The disclosures of the above-described applications are hereby incorporated by reference in their entirety. The International Application was published under PCT Article 21(2) in a language other than English.

TECHNICAL FIELD

The present invention relates to a vehicle seat provided with a coupling member that couples a cushion frame and a seatback frame together.

BACKGROUND ART

A vehicle seat according to Japanese Patent Application Laid-Open (JP-A) No. 2008-238969 is provided with a seat section and a seatback that is coupled to the seat section. The seatback includes a lower frame, with a first pin and a second pin provided to the lower frame. The seatback further includes a side frame, and a first through hole and a second through hole are formed through the side frame. The second through hole is in communication with an auxiliary hole portion, the auxiliary hole portion opening onto the side of the second through hole. The first pin is inserted into the first through hole, and the second pin is inserted into the second through hole, thereby coupling the side frame to the lower frame.

When an impact load in a vehicle rear direction is imparted to the seatback, the side frame rotates centered on the first pin, and an edge portion of the second through hole contacts the second pin at two connection portions of the second through hole and the auxiliary hole portion, and the auxiliary hole portion performs deformation so as to be pushed outwards by the second pin. The impact energy imparted to the seatback is expended as energy for deforming the auxiliary hole portion, thereby absorbing the impact load imparted to the seatback.

As described above, in such a vehicle seat, the edge portion of the second through hole contacts the second pin at the two connection portions of the second through hole and the auxiliary hole portion when impact load in the vehicle rear direction is imparted to the seatback, and the auxiliary hole portion is pushed outwards by the second pin. There might be therefore a possibility of the auxiliary hole portion being deformed even when the impact load imparted to the seatback is low. There is thus also the possibility that stably absorption of impact load imparted to the seatback may not be possible.

A vehicle seat according to Japanese National-Phase Application No. 2010-500213 is provided with a seat section structure. An adaptor is coupled to the seat section structure by a pivot and a fixing screw, and a backrest structure is coupled to the adaptor.

The adaptor is further provided with a hole into which the fixing screw is inserted. Cut-out portions are formed at specific intervals at a side portion of the hole, with connection portions configured between the hole and a cut-out portion, and between one cut-out portion and another cut-out portion.

The adaptor rotates centered on the pivot when an impact load in the vehicle rear direction is imparted to the backrest structure, and the connection portions between the cut-out portions make contact the fixing screw, such that the connection portions are rupture (deform). When one connection portion ruptures, the ruptured connection portion proceeds to contact the next inter-cut-out portion connection portion and ruptures the next connection portion. The impact energy imparted to the backrest structure is accordingly expended as energy for rupturing (deforming) each of the connection portions, enabling the impact load imparted to the backrest structure to be absorbed.

However, as described above, in this vehicle seat each of the connection portions are ruptured (deformed) discontinuously, so the impact load imparted to the seatback structure is absorbed discontinuously. Impact load can therefore not be absorbed efficiently.

DISCLOSURE OF INVENTION

Technical Subject

In consideration of the above circumstances, a subject of the present invention is to provide a vehicle seat capable of stably absorbing and capable of efficiently absorbing load imparted to a seatback frame in a rear collision.

Solution Addressing Subject

A vehicle seat according to a first aspect includes: a cushion frame provided inside a seat cushion of a vehicle seat on which an occupant sits; a seatback frame provided inside a seatback of the seat; a coupling member that rotatably supports the seatback frame, that couples together the cushion frame and the seatback frame, and that is provided with a fixing hole such that the coupling member is fixed to the cushion frame; a fixing portion that is inserted through the fixing hole, and that fixes the coupling member to the cushion frame; and a weakened portion that is provided to the coupling member, that extends continuously from an edge portion of the fixing hole to an outside of the fixing hole, and that lets the coupling member undergo relative rotation with respect to the cushion frame by performing plastic deformation due to being pushed by the fixing portion when load in the vehicle rear direction or vehicle front direction is imparted to the seatback frame at a time of vehicle collision.

The vehicle seat according to the first aspect is provided with the cushion frame inside the seat cushion of the seat on which the occupant sits, and the seatback frame is provided inside the seatback. The seatback frame is rotatably supported by the coupling member. The coupling member is provided with the fixing hole, and the fixing portion is inserted through the fixing hole, the fixing portion fixing the coupling member to the cushion frame. The coupling member is further provided with the weakened portion.

The weakened portion performs plastic deformation due to being pushed by the fixing portion when load in the vehicle rear direction or vehicle front direction is imparted to the seatback frame, allowing the coupling member to undergo relative rotation with respect to the cushion frame. The energy imparted to the seatback frame is accordingly expended as energy for plastically deforming the weakened portion, and the load imparted to the seatback frame is accordingly absorbed by the weakened portion.

The weakened portion extends continuously from the edge portion of the fixing hole to the outside of the fixing hole. Accordingly, when the weakened portion performs plastic deformation due to the fixing portion, the weakened portion does not readily deform so as to be pushed outwards, but deforms so as to be squashed. The weakened portion therefore does not readily perform plastic deformation under a low load, enabling the load imparted to the seatback frame to be absorbed stably by the weakened portion.

When the weakened portion performs plastic deformation due to the fixing portion, the weakened portion performs plastic deformation continuously. Load imparted to the seatback frame can accordingly be efficiently absorbed by the weakened portion.

A vehicle seat according to a second aspect is the vehicle seat of the first aspect wherein: the coupling member further includes a first coupling portion that is coupled to the cushion frame and a second coupling portion that is coupled to the seatback frame; and the fixing hole is disposed to a vehicle rear side of the first coupling portion and also disposed lower than the second coupling portion, such that the coupling member turns centered on the first coupling portion towards a vehicle bottom side when load in the vehicle rear direction is imparted to the seatback frame.

In the vehicle seat according to the second aspect, the weakened portion is disposed above the fixing hole since the fixing hole turns towards the bottom side with respect to the fixing portion when the coupling member turns with respect to the cushion frame. Since the weakened portion can be disposed to the second coupling portion side of the fixing hole, a body size of the coupling portion can be suppressed from increasing, and an existing component can therefore be employed.

A vehicle seat according to a third aspect is the vehicle seat of the first aspect or the second aspect, wherein the weakened portion is integral to the coupling member.

In the vehicle seat according to the third aspect, the weakened portion is integral to the coupling member. An increase in cost of the vehicle seat can accordingly be suppressed since the weakened portion and the coupling member can be manufactured as a single component.

A vehicle seat according to a fourth aspect is the vehicle seat of the first aspect or the second aspect, wherein the weakened portion is a separate body from the coupling member.

In the vehicle seat according to the fourth aspect, the weakened portion is a separate body from the coupling member. The material and thickness of the weakened portion can accordingly be easily altered, and withstand load of the weakened portion with respect to load imparted to the seatback frame can be easily varied.

A vehicle seat according to a fifth aspect is the vehicle seat of any one of the first aspect to the fourth aspect, wherein a thickness of the weakened portion becomes thicker on progression from an edge portion of the fixing hole towards the outside of the fixing hole.

In the vehicle seat according to the fifth aspect, the thickness of the weakened portion becomes thicker on progression from the edge portion of the fixing hole towards the outside of the fixing hole. The deformation load of the weakened member accordingly becomes greater the greater the amount of relative movement of the coupling member becomes with respect to the cushion frame. Load imparted to the seatback frame can accordingly be effectively absorbed by the weakened portion.

A vehicle seat according to a sixth aspect is the vehicle seat of any one of the first aspect to the fifth aspect, wherein the weakened portion is provided aligned along a movement direction of the coupling portion.

In the vehicle seat according to the sixth aspect, the weakened portion is provided aligned along the movement direction of the coupling portion. The size of the weakened portion can accordingly be suppressed from becoming larger than necessary, and the strength of the coupling member can be secured.

A vehicle seat according to a seventh aspect is the vehicle seat of any one of the first aspect to the sixth aspect, wherein a width dimension of the weakened portion is set so as to increase on progression from an edge portion of the fixing hole towards the outside of the fixing hole.

In the vehicle seat according to the seventh aspect, the width dimension of the weakened portion is set so as to increase on progression from the edge portion of the fixing hole towards the outside of the fixing hole. A deformed portion of the weakened portion that has been squashed by the fixing portion can accordingly easily be pushed to the width direction outside of the weakened portion.

Advantageous Effects of Invention

As described above, a vehicle seat according to the present invention is capable of stably and efficiently absorbing load imparted to a seatback frame in a rear collision.

BRIEF DESCRIPTION OF DRAWINGS

FIG. 4 is a perspective view of a hinge base bracket employed in an exemplary embodiment of the present invention, as viewed from front side and from right side of the vehicle;

FIG. 5 is a cross-section (taken along line 5-5 in FIG. 2) of relevant portions of a vehicle seat according to an exemplary embodiment of the present invention, as viewed from the rear side of the vehicle;

BEST MODE FOR CARRYING OUT THE INVENTION

Figure 1:
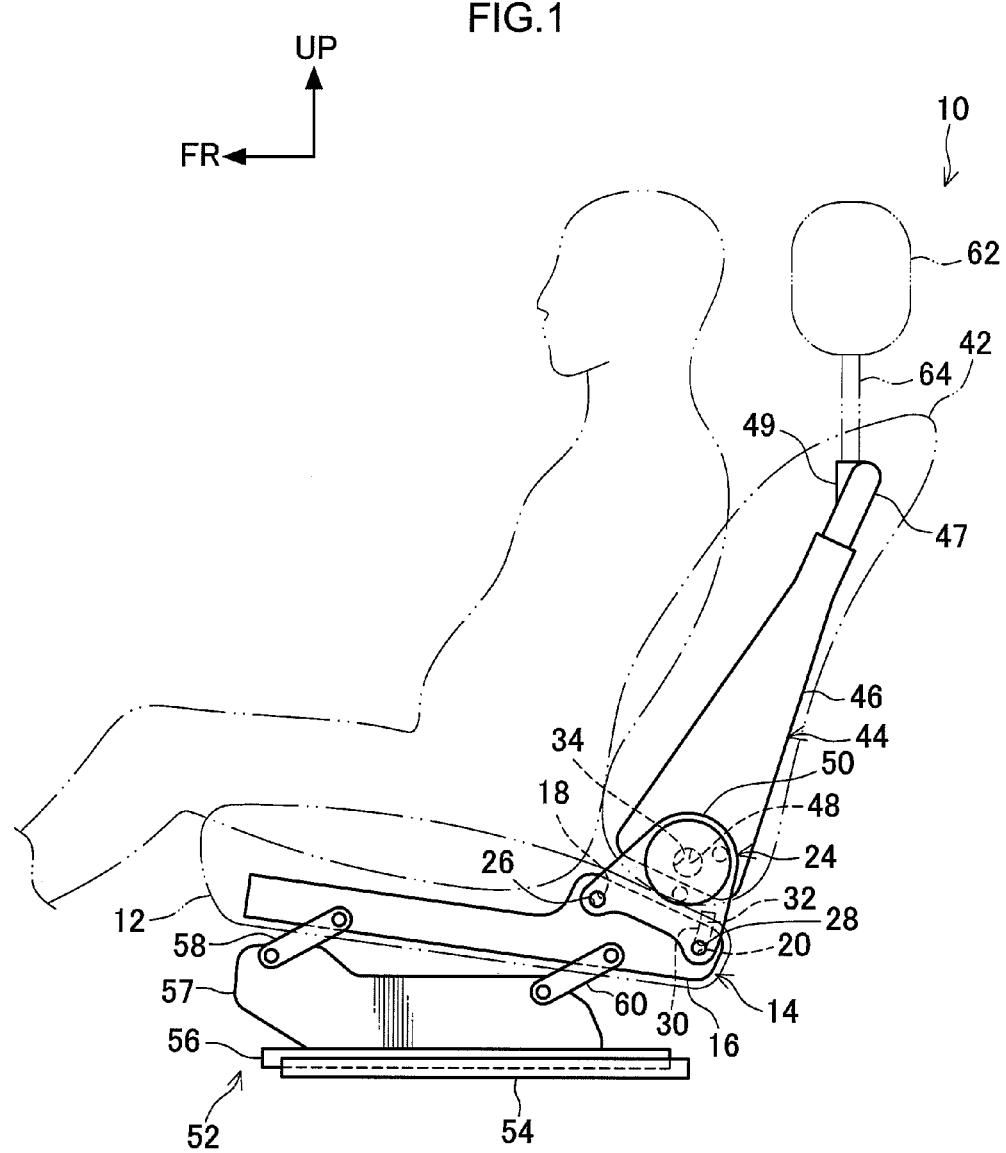
FIG. 1 is a side view illustrating a vehicle seat according to an exemplary embodiment of the present invention, as viewed from left side of a vehicle.

FIG. 1 is a side view of a vehicle seat 10 according to an exemplary embodiment of the present invention, as viewed from left side of the vehicle. Note that in the drawings an arrow FR indicates a vehicle front direction, an arrow RH indicates right direction of the vehicle, and an arrow UP indicates upwards.

As shown in FIG. 1, a front-rear position adjustment mechanism 52 is provided below the vehicle seat 10. The front-rear position adjustment mechanism 52 is provided with a pair of elongated guide rails 54. The pair of guide rails 54 are disposed parallel to each other with extending along a vehicle front-rear direction and are fixed to a vehicle body floor. Each of the guide rails 54 is respectively provided with an upper rail 56. The upper rails 56 are supported so as to be capable of sliding in the vehicle front-rear direction with respect to the guide rails 54. A riser 57 is fastened to the upper rails 56.

A first end portion of a front side link 58 configuring a height adjustment mechanism, not shown in the drawings, is coupled to a vehicle front direction portion of the riser 57 so as to be capable of relative rotation to the riser 57. A first end portion of a rear side link 60, configuring the height adjustment mechanism, is coupled to a vehicle rear direction portion of the riser 57 so as to be capable of relative rotation to the riser 57.

The vehicle seat 10 is provided with a seat cushion 12. The seat cushion 12 is disposed horizontally or inclined downwards on progression towards a vehicle rear direction. A cushion frame 14 is provided inside the seat cushion 12. The cushion frame 14 is provided with a pair of plate shaped side cushion frames 16 that are made of metal at a vehicle right side portion and a vehicle left side portion of the seat cushion 12. The pair of side cushion frames 16 is disposed along the vehicle front-rear direction. A second end portion of the front side link 58 is coupled to a vehicle front direction portion of a lower portion of the side cushion frame 16 so as to be capable of relative rotation to the side cushion frame 16, and a second end portion of the rear side links 60 is coupled to a vehicle rear direction portion of the lower portion of the side cushion frame 16 so as to be capable of relative rotation to the side cushion frame 16. The cushion frame 14 is accordingly coupled to the guide rails 54 through the height adjustment mechanism, the riser 57, and the upper rails 56.

Figure 2:
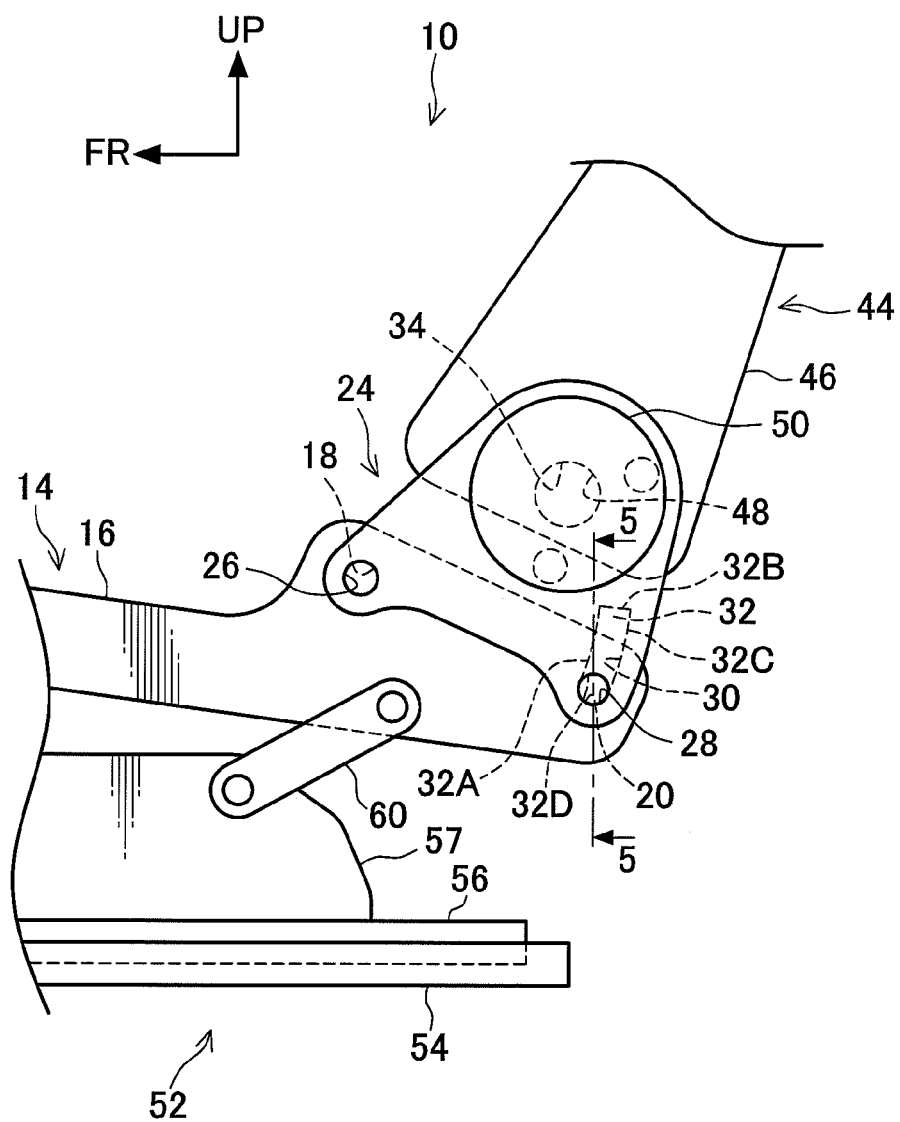
FIG. 2 is a side view illustrating relevant portions of a vehicle seat according to an exemplary embodiment of the present invention, as viewed from the left side of the vehicle.
Figure 3A:
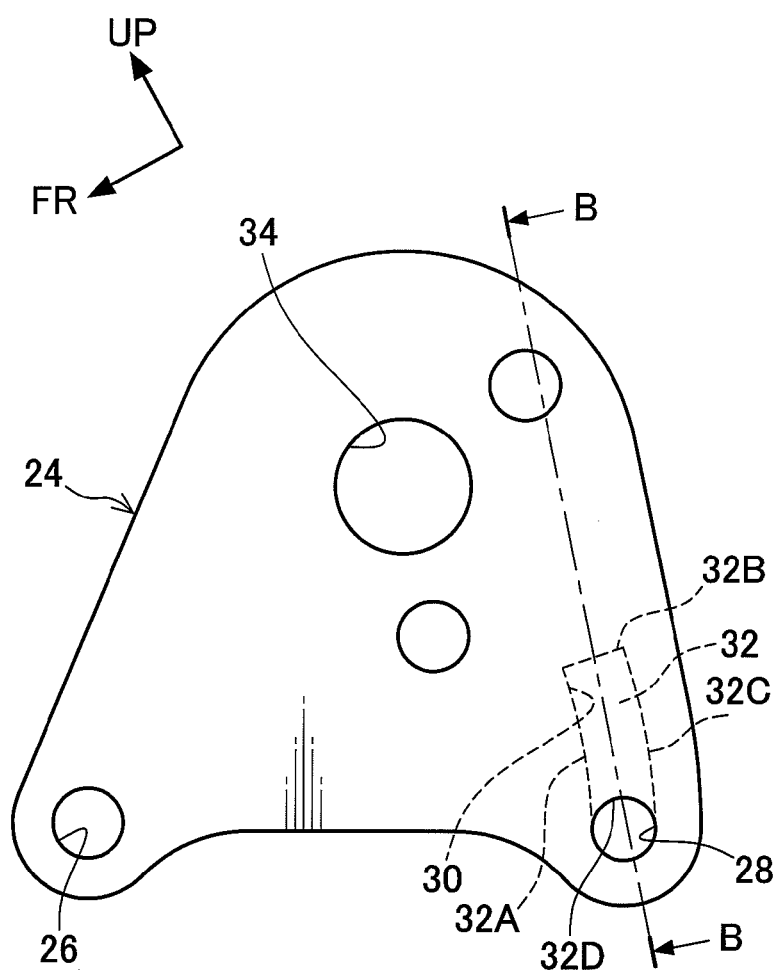
FIG. 3A is a side view illustrating a hinge base bracket illustrated in FIG. 2 as viewed from the left side of the vehicle.
Figure 3B:
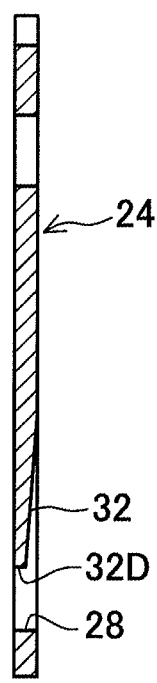
FIG. 3B is a cross-section (taken along line B-B in FIG. 3A) of the hinge base bracket illustrated in FIG. 2, as viewed from lower side and from rear side of the vehicle.

As shown in FIG. 1 and FIG. 2, a circular support hole 18 penetrates through respective upper portions of the vehicle rear direction portions of the side cushion frames 16. A circular placement hole 20 also penetrates through each side cushion frame 16 at the vehicle rear direction of the support hole 18. As shown in FIG. 5, substantially hexagonal columnar fastening nuts 22 are provided at inner peripheral faces (faces of the pair of side cushion frames 16 that oppose to each other) of the side cushion frames 16. The fastening nuts 22 are disposed coaxially to the placement holes 20 and are fixed to the side cushion frames 16 by welding. Female thread portions, not shown in the drawings, are formed penetrating central portions of the fastening nuts 22, forming female threads to inner peripheral portions of the female thread portions.

As shown in FIG. 1 to FIG. 4, substantially triangular plate shaped hinge base brackets 24 that are made from metal and serve as coupling members are respectively provided to outside face side of each of the side cushion frames 16 (faces on the opposite sides to the faces that oppose to each other of the cushion frames 16). A circular support hole 26 serving as a first coupling portion is formed penetrating a vehicle front direction portion of a lower portion of each hinge base bracket 24. The support holes 26 are disposed coaxially to the support holes 18 of the side cushion frames 16. Substantially circular columnar support bolts, not shown in the drawings, are inserted into the support holes 26 and the support holes 18, and support nuts, not shown in the drawings, are screwed onto leading end portions of the support bolts, thereby fastening (fixing) the hinge base brackets 24 to the side cushion frames 16.

As shown in FIG. 5, a circular placement hole 28 serving as a fixing hole is formed penetrating a vehicle rear direction portion of a lower portion of each hinge base bracket 24. The diameter of the placement hole 28 is set slightly larger than an external diameter of a male thread portion 40A of a fastening bolt 40, described later. The placement holes 28 are disposed coaxially to the placement holes 20 of the side cushion frames 16, and the substantially circular columnar fastening bolts 40 serving as fixing portions are inserted into the placement holes 28 and the placement holes 20. A head portion 40B of substantially hexagonal cross-section is provided to a first end portion of each fastening bolt 40. The male thread portion 40A is provided to a second end side portion of each fastening bolt 40, with a male thread formed to a peripheral outside portion of the male thread portion 40A. Leading end portions of the male thread portions 40A are screwed into the fastening nuts 22 of the side cushion frames 16. The hinge base brackets 24 are thereby also fastened (fixed) to the side cushion frames 16 at locations of the placement holes 28.

The hinge base brackets 24 are, in normal situation, configured not to relatively rotate with respect to the cushion frame 14 due to fastening force of the support bolts and the support nuts, and fastening force of the fastening bolts 40 and the fastening nuts 22.

A substantially rectangular groove portion 30 is formed to each hinge base bracket 24 at a portion above the placement hole 28. The groove portion 30 is open towards the placement hole 28 side, and is curved along a circumferential direction of a circle centered on the support hole 26.

A substantially rectangular deformable portion 32 serving as a weakened portion is provided inside the groove portion 30. A side face 32A, a face 32B, and a side face 32C of the deformable portion 32 are connected continuously to the inner peripheral faces of the groove portion 30, and the deformable portion 32 is configured integrally to the hinge base bracket 24. A side face 32D of the deformable portion 32 is curved along a circumferential direction of the placement hole 28, and is disposed in a same plane as an inner peripheral face of the placement hole 28. A curvature of the side face 32D of the deformable portion 32 is accordingly slightly gentler than a curvature of an external diameter of the male thread portion 40A of the fastening bolt 40. Outside face (a face on the opposite side to a face that faces the cushion frame 14) of the deformable portion 32 is configured in a same plane as an outside face of the hinge base bracket 24. A thickness of the deformable portion 32 is set thinner than a thickness of the hinge base bracket 24, and is configured so as to become thicker on progression from the side face 32D towards the side face 32B. The deformable portion 32 accordingly extends continuously from an edge portion of the placement hole 28 towards a radial direction outside of the placement hole 28. Rigidity of the deformable portion 32 is set lower than rigidity of the hinge base bracket 24.

A circular attachment hole 34 serving as a second coupling portion is formed penetrating a central portion of the hinge base bracket 24.

The vehicle seat 10 is provided with a seatback 42. The seatback 42 is disposed in an upright state at a vehicle rear direction end portion of the seat cushion 12. A seatback frame 44 is provided inside the seatback 42. The seatback frame 44 is provided with a pair of plate shaped side frames 46 that are made of metal at a vehicle right side and vehicle left side of the seatback 42. The side frames 46 are disposed to inside of the hinge base brackets 24. A circular attachment hole 48 is formed penetrating a lower end portion of each side frame 46, with the attachment holes 48 disposed coaxially to the attachment holes 34 of the hinge base brackets 24. The attachment holes 48 and the attachment holes 34 are supported by a reclining mechanism 50. The reclining mechanism 50 makes it possible for the side frames 46 to swing. The seatback frame 44 is thereby supported by and coupled to the hinge base brackets 24 through the reclining mechanism 50.

An upper pipe 47 is further provided to an upper portion of the seatback frame 44. The upper pipe 47 is made from pipe material with a circular ring shaped cross-section, and is bent into an inverted substantially U-shape as viewed from the vehicle front. Both end portions of the upper pipe 47 are joined to upper portions of the side frames 46 by for example welding.

A pair of substantially rectangular tube shaped holders 49 are provided to a vehicle width direction intermediate portion of the upper pipe 47. Grommets (not shown in the drawings) are provided inside the holder 49 for retaining a headrest 62, described later.

The headrest 62 is provided above the seatback 42. Stays 64 are provided inside the headrest 62. The stays 64 project downwards from the headrest 62, and are retained inside the grommets. The headrest 62 is thereby assembled above the seatback 42.

Explanation follows regarding operation of the present exemplary embodiment.

In the vehicle seat 10 of the present exemplary embodiment, a force towards the vehicle rear direction acts on the occupant due to inertia when, with the occupant in a seated state in the vehicle seat 10, another vehicle collides with the vehicle from the vehicle rear direction (rear collision), or the vehicle is involved in a collision with for example another vehicle when the vehicle is travelling backwards. When this occurs, the occupant moves towards the seatback 42 side under the force due to inertia, and a vehicle rear direction impact load is imparted to the seatback 42 (the seatback frame 44) from the occupant.

Figure 6:
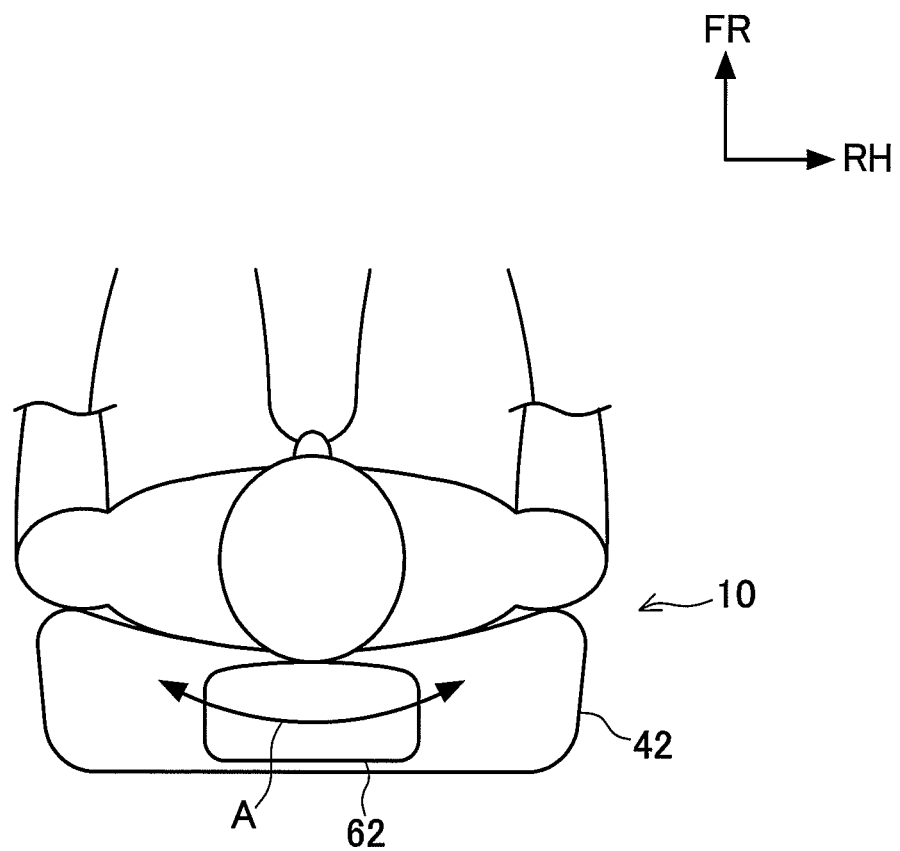
FIG. 6 is a plan view of the vehicle seat illustrated in FIG. 1 as viewed from upper side.

When the vehicle rear direction impact load is imparted to the seatback 42 (seatback frame 44), this impact load is transmitted through the side frames 46 and the reclining mechanism 50 to the hinge base brackets 24, and a rotation force acts on the hinge base brackets 24 in the clockwise direction of FIG. 1, centered on the support holes 26 (towards a bottom side of the vehicle). When this occurs, an eccentric load, arising from the impact load imparted by the occupant in the vehicle rear direction to the seatback frame 44, acts on the reclining mechanism 50 in one of arrow A directions in FIG. 6.

The hinge base brackets 24 rotate about an axis of the support holes 26 when the rotation force at the hinge base brackets 24 is greater than the fastening force of the support bolts and support nuts, and the fastening force of the fastening bolt 40 and the fastening nuts 22. When the hinge base brackets 24 rotate about the axis of the support holes 26, the side faces 32D of the deformable portions 32 of the hinge base brackets 24 are contacted by outer peripheral portions of the male thread portions 40A of the fastening bolts 40, and a press-contact force acts on the side faces 32D of the deformable portions 32.

The deformable portions 32 are plastically deformed by the fastening bolts 40 when this press-contact force is greater than mechanical strength of the deformable portions 32, and the hinge base brackets 24 undergo relative movement with respect to the cushion frame 14 (coupling bolts 40). Accordingly, the impact energy imparted to the seatback frame 44 is expended as energy to plastically deform the deformable portion 32, thereby absorbing impact load imparted to the seatback frame 44.

Figure 7:
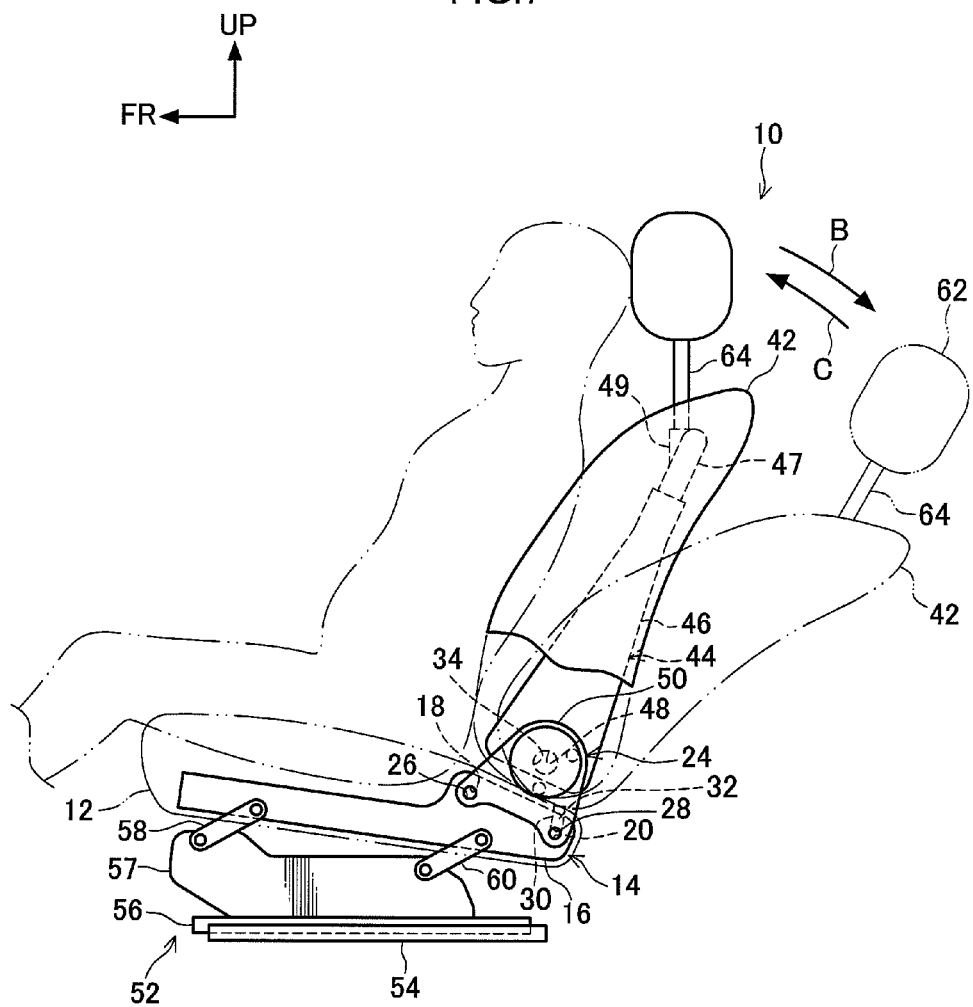
FIG. 7 is a schematic view illustrating a rebound position to which the seatback employed in the vehicle seat illustrated in FIG. 1 rebounds.

When this occurs, as shown in FIG. 7, the seatback 42 (seatback frame 44) and the headrest 62 swing towards the vehicle rear direction (the direction of arrow B in FIG. 7) as far as a rebound position (the position illustrated by double-dotted dashed lines in FIG. 7). At the rebound position, the seatback 42 and the headrest 62 rebound, and the seatback 42 and the headrest 62 swing from the rebound position towards the vehicle front direction (the direction of arrow C in FIG. 7), the seatback 42 (seatback frame 44) and the headrest 62 returning to the position illustrated by solid lines in FIG. 7.

Each of the deformable portions 32 extends continuously from the edge portion of the placement hole 28 towards the radial direction outside of the placement hole 28, and the side face 32A, side face 32B and side face 32C of the deformable portion 32 are connected continuously at the inner peripheral face of the groove portion 30 of the hinge base bracket 24. Accordingly, when the deformable portion 32 is plastically deformed by the fastening bolt 40 due to the rotation force acting on the hinge base bracket 24, the deformable portion 32 does not readily deform so as to be pushed outwards by the male thread portion 40A, but deforms so as to be squashed by the male thread portion 40A. Therefore, the deformable portion 32 does not readily deform when a low press-contact force acts on the side face 32D, and the impact load imparted to the seatback frame 44 can be stably absorbed by the deformable portion 32.

When the deformable portion 32 is plastically deformed by the fastening bolt 40, the deformable portion 32 performs continuous deformation. The impact load imparted to the seatback frame 44 can accordingly be continuously absorbed by the deformable portion 32. The impact load imparted to the seatback frame 44 can accordingly be efficiently absorbed by the deformable portion 32.

Moreover, the placement hole 28 of the hinge base bracket 24 is disposed at the vehicle rear side of the support hole 26 and disposed below the attachment hole 34. When impact load is imparted to the seatback frame 44 in the vehicle rear direction, the hinge base bracket 24 is turned towards the vehicle bottom side about an axis of the support hole 26 (the support bolt).

Since the placement hole 28 is turned towards a lower side with respect to the fastening bolt 40, the deformable portion 32 can accordingly be disposed above the placement hole 28. Since the deformable portion 32 is disposed at an attachment hole 48 side, an increase in a body size of the hinge base bracket 24 can be suppressed, and an existing hinge base bracket 24 can therefore be employed.

The deformable portion 32 is connected to the groove portion 30 of the hinge base bracket 24, and is integral to the hinge base bracket 24. The deformable portion 32 and the hinge base bracket 24 can accordingly be manufactured as a single component, and an increase in cost of the vehicle seat 10 can therefore be suppressed.

The thickness of the deformable portion 32 is moreover configured so as to become thicker on progression from the side face 32D towards the side face 32B of the deformable portion 32. The deformation load for the deformable portion 32 accordingly becomes greater as an amount of relative movement (turn amount) of the hinge base bracket 24 with respect to the cushion frame 14 increases. Impact load imparted to the seatback frame 44 can accordingly be effectively absorbed by the deformable portion 32.

The deformable portion 32 is continuous to the groove portion 30 of the hinge base bracket 24. When the deformable portions 32 have been deformed by the fastening bolts 40 due to impact load imparted to the seatback frame 44 towards the vehicle rear direction, the vehicle seat 10 can be repaired by replacing the hinge base brackets 24.

Figure 8:
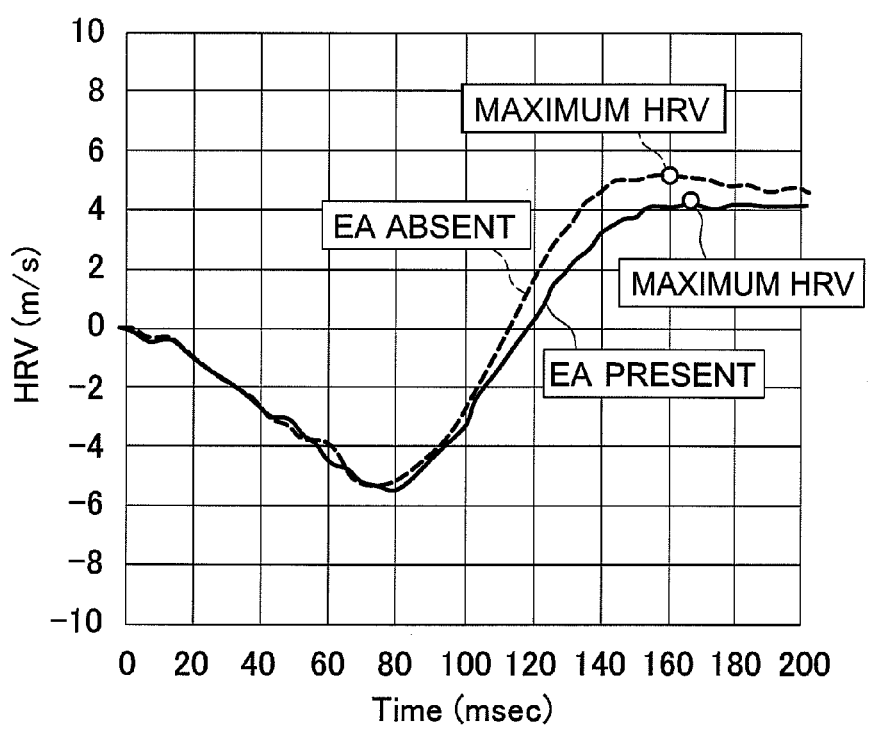
FIG. 8 is a graph showing movement velocity of the head of an occupant in a rear collision of the vehicle seat illustrated in FIG. 1.

Since impact energy imparted to the seatback frame 44 can be absorbed by plastic deformation of the deformable portion 32, a velocity of the headrest 62 can be reduced when the seatback 42 and the headrest 62 swing. A velocity with which the head of the occupant is thrown towards the vehicle front side (referred to as Head Rebound Velocity, abbreviated as HRV below) can therefore also be reduced, enabling protection performance with respect to the head of the occupant to be enhanced. As shown in FIG. 8, in the present exemplary embodiment the velocity of the headrest 62 when the headrest 62 swings from the rebound position towards the vehicle front side can be reduced in comparison to a comparative example in which the deformable portions 32 are not provided to the hinge base brackets 24. As a result the maximum HRV value of the present exemplary embodiment is lower than the maximum HRV value of the comparative example. Note that in FIG. 8, the horizontal axis shows time from the point of a rear collision, and the vertical axis shows velocity (HRV). FIG. 8 illustrates the HRV of the present exemplary embodiment by the straight line marked "EA present", and indicates the HRV of the comparative example by the dashed line marked "EA absent".

A pressing force when the headrest 62 swings from the rebound position towards the vehicle front side and the headrest 62 presses the head of the occupant can accordingly be reduced. Protection performance with respect to the head of the occupant can accordingly be enhanced.

Figure 9:
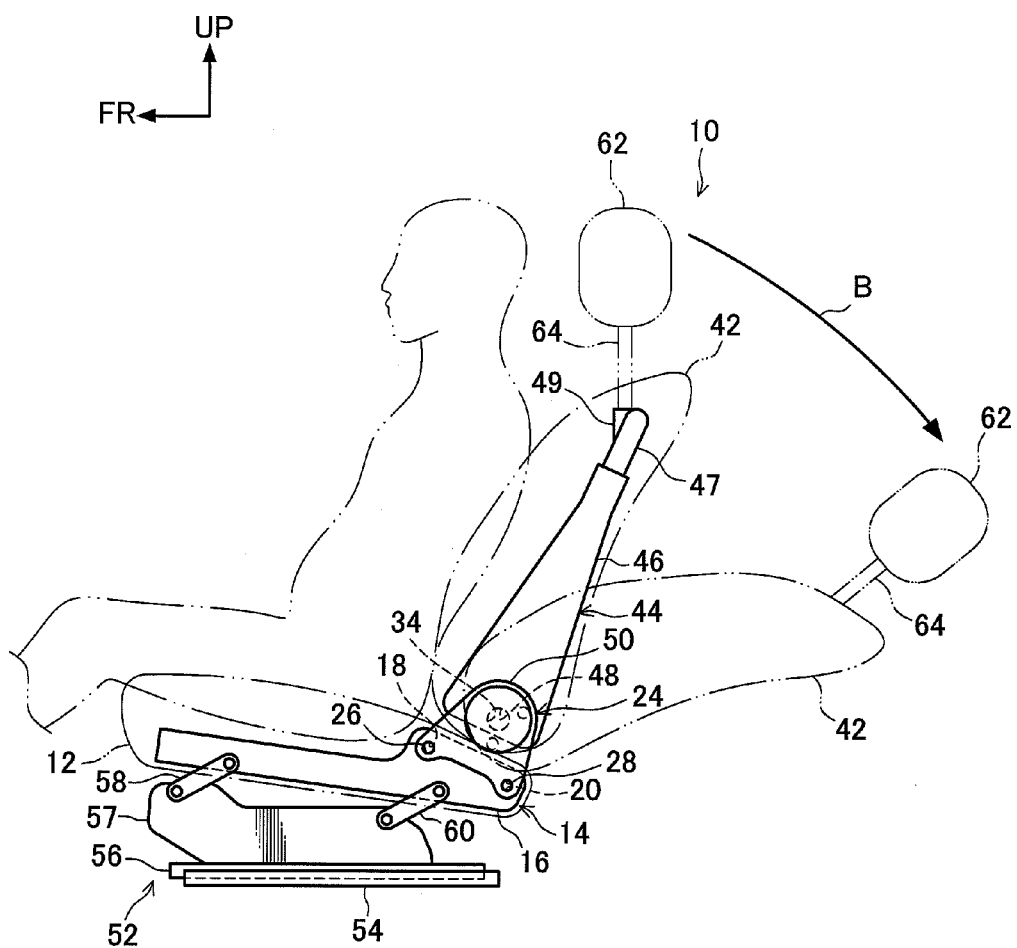
FIG. 9 is a schematic view illustrating a position of a seatback in a theoretical situation in which a reclining mechanism employed in the vehicle seat illustrated in FIG. 1 has been damaged.

Since impact energy imparted to the seatback frame 44 can be absorbed by the plastic deformation of the deformable portion 32, the eccentric load acting on the reclining mechanism 50 can be reduced. Disengagement of locking of the reclining mechanism 50 can accordingly be prevented, thereby preventing the seatback 42 from tipping back too far in the vehicle rear direction. The seatback 42 can therefore reliably support the occupant. That is to say, the eccentric load acting on the reclining mechanism 50 would be greater if the deformable portions 32 were omitted from the hinge base brackets 24, and there might be a case that the locking of the reclining mechanism 50 would be disengaged by the eccentric load. As shown in FIG. 9, in cases in which locking of the reclining mechanism 50 has been disengaged, the seatback 42 tips back too towards the vehicle rear side (in the arrow B direction in FIG. 9), and the seatback 42 can no longer reliably support the occupant.

First Modified Example

In the first modified example, the deformable portion 32 and the hinge base bracket 24 are configured as separate bodies.

The side face 32A, the side face 32B and the side face 32C of the deformable portion 32 are disposed facing an inner peripheral face of the groove portion 30 of the hinge base bracket 24, and are respectively connected to the groove portion 30 by welding, thereby fixing the deformable portion 32 to the hinge base bracket 24.

The material and thickness of the deformable portion 32 can accordingly be altered with ease, and a withstand load of the deformable portion 32 with respect to impact load imparted to the seatback frame 44 can be set with ease.

Note that in the first modified example, the deformable portion 32 is fixed to the hinge base brackets 24 by welding. Alternatively, the deformable portion 32 may be fixed to the hinge base brackets 24 by swaging. In such cases, for example, a flange is provided to an outer peripheral portion except the side face 32D of the deformable portion 32 and holes are formed penetrating the flange portion. Swaging projections are further provided to the hinge base bracket 24 corresponding to the holes, and the deformable portion 32 is fixed to the hinge base bracket 24 by swaging the projections.

Second Modified Example

Figure 10:
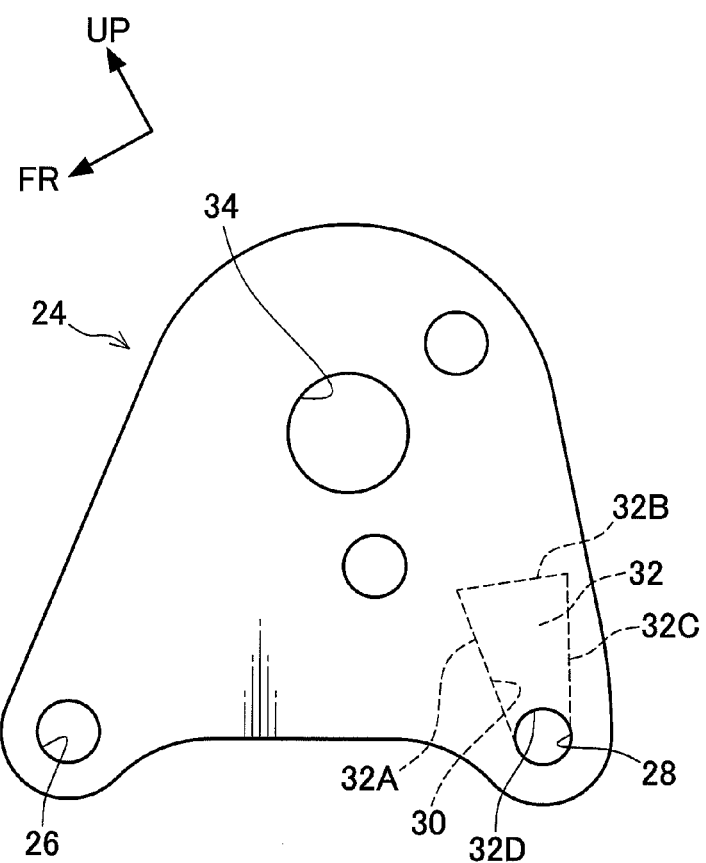
FIG. 10 is a side view of a hinge base bracket employed in an exemplary embodiment of the present invention, as viewed from the left side of the vehicle.

As shown in FIG. 10, in the second modified example, the width dimension of the groove portion 30 of the hinge base bracket 24 is set so as to increase on progression from the edge portion of the placement hole 28 towards outside of the placement hole 28, and the width dimension of the deformable portion 32 is set so as to increase on progression from the side face 32D towards the side face 32B.

A deformed portion of the squashed deformable portion 32 can accordingly be easily pushed towards the width direction outside of the deformable portion 32 when the deformable portion 32 is being squashed by the fastening bolt 40.

Note that in the present exemplary embodiment, the first modified example and the second modified example, the thickness of the deformable portion 32 is set so as to become thicker on progression from the side face 32D towards the side face 32B. The thickness of the deformable portion 32 may alternatively be made uniform.

Moreover, in the present exemplary embodiment, the first modified example and the second modified example, the outside face of the deformable portion 32 (the face on the opposite side to the face that faces the cushion frame 14) is configured in the same plane as the outside face of the hinge base bracket 24, with the thickness of the deformable portion 32 set thinner than the thickness of the hinge base bracket 24, becoming thicker on progression from the side face 32D towards the side face 32B. Alternatively, the inside face of the deformable portion 32 (the face that faces the cushion frame 14) may be configured in the same plane as the inside face of the hinge base bracket 24, with the thickness of the deformable portion 32 configured thinner than the thickness of the hinge base bracket 24, becoming thicker on progression from the side face 32D towards the side face 32B.

Figure 11:
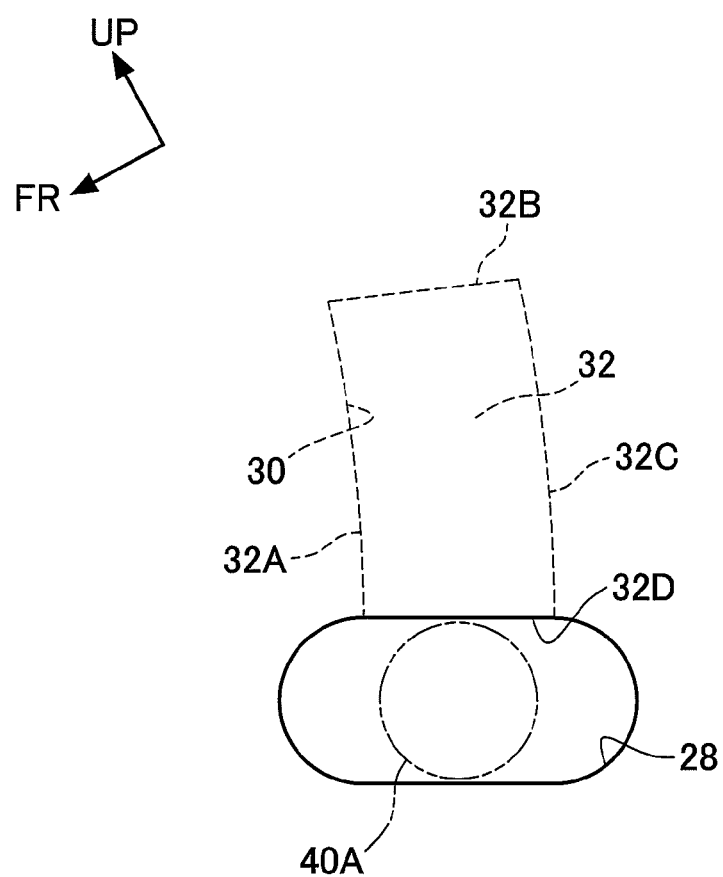
FIG. 11 is a side view of a placement hole of a hinge base bracket employed in an exemplary embodiment of the present invention, as viewed from the left side of the vehicle.

In the present exemplary embodiment, the first modified example and the second modified example, the placement hole 28 is formed through the hinge base bracket 24 in a circular shape, however the shape of the placement hole 28 is not limited thereto. For example, as shown in FIG. 11, the placement hole 28 may be formed through in a substantially elliptical shape, with the placement hole 28 disposed such that a length direction of the placement hole 28 is disposed over a line linking the support hole 26 and the placement hole 28.

In the present exemplary embodiment, the first modified example and the second modified example, the fastening bolts 40 are screwed into the fastening nuts 22 fixed to the cushion frame 14, coupling the hinge base brackets 24 to the cushion frame 14. The fastening bolts 40 may alternatively be fixed to the cushion frame 14 in a state in which the male thread portions 40A of the coupling bolts 40 project out to the hinge base bracket 24 sides, and the hinge base brackets 24 are coupled to the cushion frame 14 by the fastening nuts 22.

Figure 12:
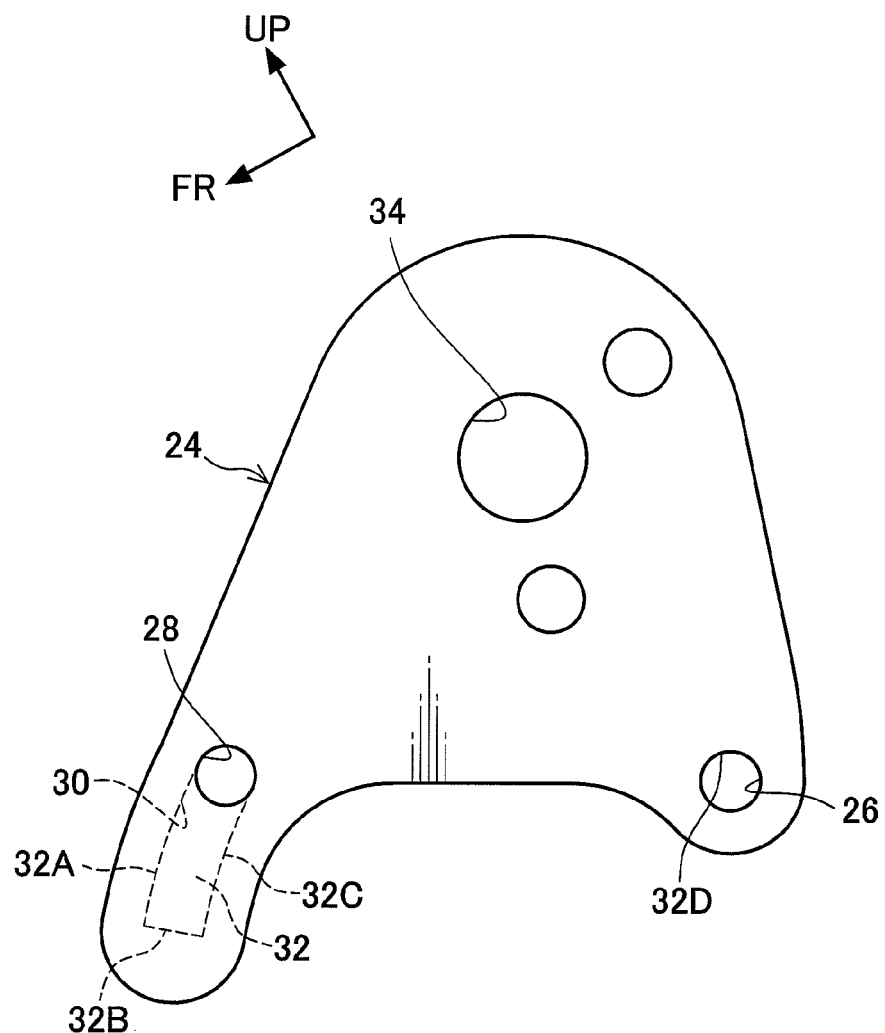
FIG. 12 is a side view of a hinge base bracket employed in an exemplary embodiment of the present invention, as viewed from the left side of the vehicle.

In the present exemplary embodiment, the first modified example and the second modified example, the placement hole 28 is disposed at the vehicle rear side of the support hole 26 in the hinge base bracket 24. When impact load in the vehicle rear direction is imparted to the seatback frame 44, the hinge base brackets 24 are turned about an axis of the support holes 26. Alternatively, as shown in FIG. 12, configuration may be made with the placement hole 28 formed penetrating a vehicle front direction portion of the lower portion of the hinge base bracket 24, and with the support hole 26 formed penetrating a vehicle rear direction portion of the lower portion of the hinge base bracket 24, such that the hinge base bracket 24 is turned about an axis of the support hole 26 when impact load in the vehicle rear direction is imparted to the seatback frame 44. In such cases, the deformable portion 32 is disposed below the placement hole 28.

Moreover, in the present exemplary embodiment, the first modified example and the second modified example, the deformable portion 32 is provided at the hinge base bracket 24 above the placement hole 28. The deformable portion 32 may alternatively also be provided at the hinge base bracket 24 below the placement hole 28. Damage to the reclining mechanism 50 in a frontal collision can thus also be prevented in such a configuration.

Detailed explanation follows regarding this point. For example, when luggage or an occupant of a rear seat collide with the seatback 42 from the vehicle rear side during a vehicle frontal collision, the smaller the displacement amount of the upper pipe 47 towards the vehicle front side, the higher the occupant protection performance. Accordingly, by raising the rigidity of the seatback frame 44, the reaction force of the seatback frame 44 with respect to impact force imparted to the seatback frame 44 from luggage or an occupant of the rear seat can be increased, enabling the displacement amount of the upper pipe 47 towards the vehicle front side to be reduced (suppressed).

However, since the impact force transmitted from the luggage or the occupant of the rear seat through the seatback frame 44 to the reclining mechanism 50 increases when the rigidity of the seatback frame 44 is raised, the reclining mechanism 50 may be damaged.

However, by providing the deformable portion 32 at the hinge base bracket 24 below the placement hole 28 also, when impact force is imparted to the seatback 42 from the vehicle rear side, the hinge base brackets 24 are rotated centered on the support holes 26 in the anticlockwise direction of FIG. 1 (towards the vehicle top), and the deformable portions 32 perform plastic deformation due to the coupling bolts 40. The impact force transmitted through the seatback frame 44 to the reclining mechanism 50 can accordingly be reduced.

The reaction force of the seatback frame 44 with respect to impact force imparted to the seatback frame 44 during a frontal collision, and the displacement amount of the upper pipe 47 towards the vehicle front side, can accordingly be regulated (controlled) by making appropriate changes (adjustments) to the material of the hinge base brackets 24 and to the shape of the provided deformable portions 32, whilst reducing the impact force transmitted to the reclining mechanism 50. Damage to the reclining mechanism 50 in a frontal collision can accordingly be prevented. Moreover, by additionally providing the deformable portion 32 to the hinge base bracket 24 below the placement hole 28, the impact absorption characteristics of the vehicle seat 10 in a rear collision and the protection performance with respect to the occupant in a frontal collision can both be secured by the hinge base bracket 24.

The invention claimed is:

1. A vehicle seat comprising:
   a cushion frame provided inside a seat cushion of a vehicle seat on which an occupant sits;
   a seatback frame provided inside a seatback of the seat;
   a coupling member that rotatably supports the seatback frame, that couples together the cushion frame and the seatback frame, and that is provided with a fixing hole such that the coupling member, is fixed to the cushion frame;
   a fixing portion that is inserted through the fixing hole, and that fixes the coupling member to the cushion frame; and
   a weakened portion that is provided to the coupling member, that extends upward or downward continuously from an edge portion of the fixing hole, and that lets the coupling member undergo relative rotation with respect to the cushion frame by performing plastic deformation due to being pushed by the fixing portion when load in the vehicle rear direction or the vehicle front direction is imparted to the seatback frame at a time of vehicle collision,
   wherein the coupling member and the weakened portion are plate shaped, and a plate thickness of the weakened portion at an area close to the edge portion of the fixing hole is thinner than a plate thickness of the coupling member and becomes gradually thicker on progression of extending upward or downward from the edge portion of the fixing hole.

2. The vehicle seat of claim 1 wherein:
   the coupling member further comprises a first coupling portion that is coupled to the cushion frame and a second coupling portion that is coupled to the seatback frame; and
   the fixing hole is disposed to a vehicle rear side of the first coupling portion and also disposed lower than the second coupling portion, such that the coupling member turns centered on the first coupling portion towards a vehicle bottom side when load in the vehicle rear direction is imparted to the seatback frame.

3. The vehicle seat of claim 1, wherein the weakened portion is integral to the coupling member.

4. The vehicle seat of claim 1, wherein the weakened portion is a separate body from, the coupling member.

5. The vehicle seat of claim 1, wherein the weakened portion is provided aligned along a movement direction of the coupling portion.

6. The vehicle seat of claim 1, wherein a width dimension of the weakened portion is set so as to increase on progression from the edge portion of the fixing hole towards the outside of the fixing hole.

7. The vehicle seat of claim 1, wherein an outside face of the weakened portion is configured in a same plane as an outside face of the coupling member, and the plate thickness of the weakened portion is set thinner than the plate thickness of the coupling member.

* * * * *